Mar. 13, 1923. 1,448,016

W. WELSHAUSEN

WINDSHIELD ATTACHMENT

Filed Aug. 17, 1921

Inventor

W. Welshausen.

By Larry F Lacey, Attorneys

Patented Mar. 13, 1923.

1,448,016

UNITED STATES PATENT OFFICE.

WILLIAM WELSHAUSEN, OF ALLENHURST, NEW JERSEY.

WINDSHIELD ATTACHMENT.

Application filed August 17, 1921. Serial No. 492,985.

*To all whom it may concern:*

Be it known that I, WILLIAM WELSHAUSEN, a citizen of the United States, residing at Allenhurst, in the county of Monmouth and State of New Jersey, have invented certain new and useful Improvements in Windshield Attachments, of which the following is a specification.

The object of this invention is to provide a simple, efficient and inexpensive device which may be readily applied to the frame of an automobile windshield or to the frame of the machine and readily adjusted so as to shade the eyes of the chauffeur from the glare of approaching headlights or the glare from the sun when the same is low in the sky. The invention is illustrated in the accompanying drawings and will be hereinafter fully set forth.

In the drawings—

Figure 1:
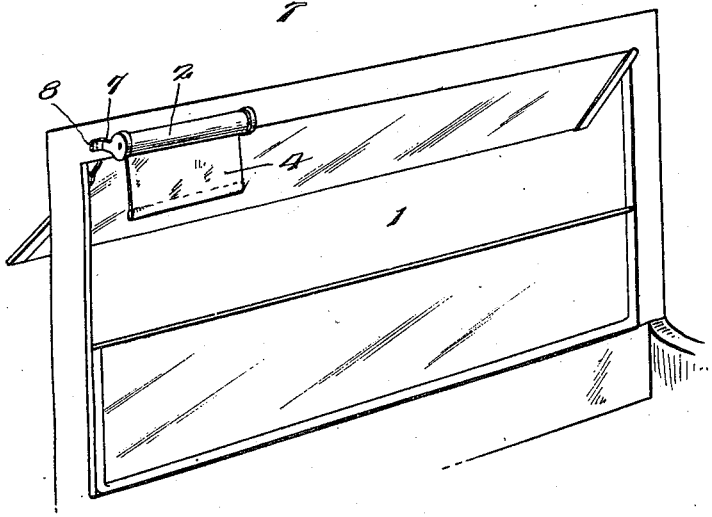
Figure 1 is a perspective view showing my device in position upon the frame of a windshield.
Figure 2:
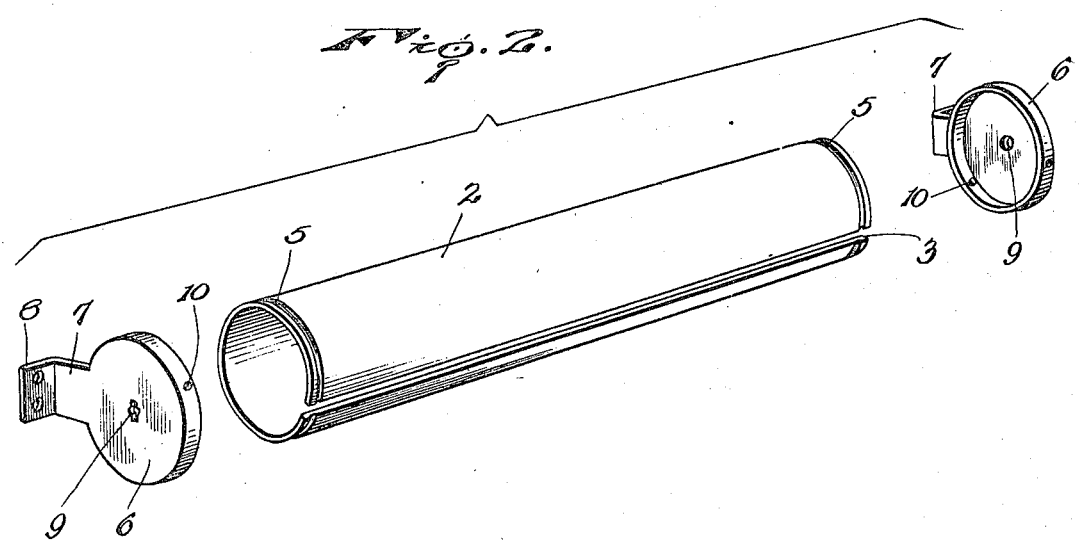
Fig. 2 is a perspective view showing the casing and the supports for the same separated but in their proper relative positions.

The windshield, indicated generally at 1, may be of any usual or preferred form. In carrying out my invention, I employ a cylindrical casing 2 which is split from end to end, as shown at 3, to provide a slot or opening through which the shade 4 may be drawn. The cylindrical casing 2 is provided in its exterior surface, adjacent each end, with an annular groove 5 and, within the casing, the shade 4 is wound upon a spring shade roller of well-known type. The casing 2 is supported by and between end caps 6 which are each provided with a lateral supporting arm or bracket 7 formed at its extremity with a base 8 through which fastening devices may be inserted into the frame of the windshield or some fixed part of the automobile. The caps are provided centrally with openings 9 to receive the trunnions of the shade roller and one of these openings is circular, while the other is elongated to be engaged by the corresponding trunnions and thereby cause winding and unwinding of the spring, as usual. The rim portion of each cap has small projections or teats 10 struck inwardly therefrom to engage the grooves 5 in the casing 2 so that, after the ends of the casing have been sprung into the caps, the accidental separation of the caps and the casing will be prevented but the casing may be shifted pivotally within the caps so as to bring the opening or slot 3 through which the shade 4 passes into such position as is most convenient or desirable to the chauffeur.

It is thought the use of the device will be evident from the accompanying drawings and the foregoing description. In daylight, when the sun is high or behind a cloud so that it does not shine directly into the eyes of the chauffeur, the shade may be raised so as to be wound within the casing, but if there should be a glare which blinds the chauffeur or interferes with his control of the machine, the shade may be readily pulled down so as to cut off the glare while permitting a clear view of the road ahead. The device is exceedingly simple and may be readily installed at a very low cost. When the device is applied, it does not interfere in any way with the usual operation of the machine or the adjustment of the windshield or of any other parts, and it obviously occupies very little space so that it does not detract from the sightliness of the automobile. The casing is somewhat resilient so that the frictional engagement between the exterior surface of the casing and the interior surface of the rims of the caps will suffice to hold the casing in a set position.

Having thus described the invention, what is claimed as new is:

1. An attachment for automobile windshields comprising a cylindrical casing split from end to end to provide an exit and provided exteriorily adjacent each end with an annular groove, end caps provided with internal projections adapted to engage in said annular grooves whereby to support the casing and permit rotation of the same, said end caps being provided centrally with openings to receive the trunnions of a shade roller housed within the casing, and supporting arms extending laterally from said end caps and adapted to be secured to a fixed support.

2. An attachment for windshields comprising a resilient split casing, end caps rotatably receiving the casing and frictionally engaged thereby, means for preventing withdrawal of the end caps from the casing, and a shade wound within the casing and adjustable through the split therein.

3. A shade holder including a split casing having grooves opening into the split of the casing, and end caps fitting over the ends of the casing and provided with means adapted to enter said grooves through the split of the casing to engage in said grooves normally locking the caps against displacement.

4. A shade holder including a split casing having grooves opening into the split of the casing, and end caps fitting over the ends of the casing and provided with means adapted to enter said grooves through the split of the casing to engage in said grooves normally locking the caps against displacement, the casing being adjustable rotatably upon the caps and expanding thereagainst for normally locking the casing in adjusted position.

In testimony whereof I affix my signature.

WILLIAM WELSHAUSEN. [L. S.]